United States Patent
Schmidt et al.

(10) Patent No.: US 6,363,258 B1
(45) Date of Patent: Mar. 26, 2002

(54) COMMUNICATIONS SYSTEM PROVIDING CALL TYPE INDICATION FOR GROUP CALLS

(75) Inventors: Paul E. Schmidt, Forest; Thomas A. Przelomiec, Lynchburg, both of VA (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/428,893

(22) Filed: Oct. 28, 1999

(51) Int. Cl.[7] ................................................. H04B 7/00
(52) U.S. Cl. ....................... 455/514; 455/518
(58) Field of Search ................... 455/422, 450, 455/452, 509, 512, 513, 514, 517, 518, 519

(56) References Cited

U.S. PATENT DOCUMENTS

| | | |
|---|---|---|
| 5,635,914 A | 6/1997 | Petreye et al. |
| 5,809,018 A | 9/1998 | Lehmusto .................... 455/422 |
| 6,289,223 B1 * | 9/2001 | Mukherjee et al. .......... 455/518 |

* cited by examiner

*Primary Examiner*—Thanh Cong Le
(74) *Attorney, Agent, or Firm*—Coats & Bennett, P.L.L.C.

(57) ABSTRACT

A group call server supplies communications terminals of a certain type with an indication of call type, and optionally other information, for group calls so as to distinguish such calls from other types of calls. The group call server in charge of the group call may selectively augment the calling party number field of the outgoing paging message with one or more indicator flags when the targeted communications terminal is adapted to receive and act upon such information. The indicator flags indicate one or more characteristics of the group call, such as call type, call subtype, or priority level. One flag may indicate priority level and another may indicate the call subtype of the group call. The communications terminals receiving the augmented paging message will base their response, such as to auto-answer or not, on the group call characteristics indicated in the paging message. The group call server may rely on already built-in flexibility in existing signaling and air interface protocols so that the method disclosed herein may be implemented without the need to change the air interface or the BMI.

25 Claims, 4 Drawing Sheets

COMMUNICATIONS SYSTEM PROVIDING CALL TYPE INDICATION FOR GROUP CALLS

BACKGROUND OF THE INVENTION

The present invention relates to the field of communications systems, and more particularly to a method of handling group calls in a communications system, such as in a wireless communications system.

The use of portable wireless communications devices, such as cellular phones, personal communications assistants, and the like, is rapidly increasing throughout society. These wireless communications devices come in a wide variety of configurations, depending on their intended applications. For instance, common cellular telephone mobile terminals attempt to mimic traditional landline telephones, but with additional functionality, such as portability and memorization of large numbers of phone numbers. One trait of landline phones retained in most cellular phones is the ability to engage in full duplex communications. In the typical one-on-one conversation, full duplex operation allows both parties to simultaneously speak, as contrasted with the old prior art of mobile trunked-radio phones which allow only one party to speak at a time. In addition, with conference call or other multi-party capability, more than two parties can typically talk simultaneously. For ease of reference, this full duplex mode of operation will be referred to as "phone mode." The details of phone mode operation in cellular phones are well known in the art.

Some cellular phones are not only capable of operating in phone mode, but also in what will be referred to herein as radio mode. Examples of such dual-mode devices may be seen in U.S. Pat. 5,450,618 and U.S. patent applications Ser. Nos. 09/361,941 and 09/361,747, all of which are incorporated herein by reference, and U.K. Patent Application 9214180.3. In radio mode, the phone appears to the user to handle communications in a half-duplex manner. That is, the cellular phone does not appear to th user as simultaneously transmitting and receiving voice data. Instead, the user must typically push a button known as a push-to-talk (PTT) button in order to include data corresponding to the user's voice in the data transmitted; otherwise, the phone appears to the user as if it is receiving only. In addition, dual-mode phones typically automatically answer incoming calls when in radio mode.

With increasing frequency, cellular telephones, other mobile terminals, and communications terminals in general are being used for group calls. Group calls are special types of calls where the call originator is trying to communicate with one or more members of a predefined user group. The members of the predefined group may be reached using a wide variety of equipment, such as traditional landline telephones, cellular telephones, satellite telephones, personal communications assistants, pagers, and the like. The most common type of group call is a conference call involving a predetermined plurality of users on a plurality of phones, such as all the engineers on a project. Another type of group call is a broadcast group call from one location to all listening members, such as a group call from a police station to all patrolmen in a given precinct. One common characteristic of group calls is that while less than all the group members may be participating in any given group call, the list of possible participants in the group call other than the originator for the group call (i.e., the group members) is known before the call begins.

As mentioned above, many communications terminals, such as dual-mode phones, typically automatically answer incoming calls in some situations, such as when in radio mode. However, just because the phone answers the call does not necessarily mean that the user is actually attending to the phone. Instead, it is possible that the user has the phone in a mode that auto-answers, such as in radio mode, but has left the unit unattended. If so, then an incoming call may be answered, only to have the originator face the unenviable task of speaking to a phone with no user present. In the context of group calls, this auto-answer feature may present particular problems. It is often desirable for the phone not to auto-answer group calls, or at least certain kinds of group calls. Given this, there is a need for a mechanism by which the communications terminal can determine, prior to answering the call, whether an incoming call is a group call, and optionally some more detailed characteristics of the group call, rather than being a "normal" call. However, there are no known methods for a mobile terminal to determine when the call is group call or is a non-group call (or other aspects of group call). Therefore, there remains a need for a method of indicating to a communications terminal, such as a wireless communications mobile terminal when an incoming call is a group call so that the communications terminal may respond appropriately. Optionally, such a method may also indicate more detailed information about the group call, so that the communications terminal may more finely tune its response to the call.

SUMMARY OF THE INVENTION

The present invention supplies certain types of communications terminals with an indication of call type, and optionally other information, for group calls so as to distinguish such calls from other types of incoming calls.

In one typical embodiment, the Group Call Server in charge of the group call selectively augments the calling party number field of the outgoing paging message with one or more indicator flags when the targeted communications terminal is adapted to receive and act upon such information. The indicator flags indicate one or more characteristics of the group call, such as call type, call subtype, or priority level. When the group call server of the present invention receives a group call request, the group call server consults its user group database. The database has records therein corresponding to group members of the requested user group. The records preferably include an indication of the equipment type of the corresponding equipment for each call address (e.g., phone number). When the equipment type is indicated to be of a certain type, or types, corresponding to communications terminals adapted for cooperation with the present invention, (e.g., Enhanced Terminals) the group call server alters the calling party field of the page message to include additional information; otherwise the group call server proceeds as in the prior art. For instance, the group call server can augment the calling party number to add one or more indicator flags. By way of example, a first flag may indicate priority level and a second flag may indicate the call subtype of the group call. In short, the group call server initiates a paging message that includes additional information about the group call for Enhanced Terminals. It is expected that the Enhanced Terminals receiving the augmented paging message will base their response, such as whether to auto-answer or not, on the group call characteristics indicated in the paging message.

In its preferred embodiments, the present invention allows for both the enhanced group call server and the enhanced communications terminals to provide this added functionality while still remaining backwardly compatible with existing installed systems, such as ANSI-136 systems. That is, in preferred embodiments, the present invention relies on already built-in flexibility in existing air interface protocols. As such, the present invention can be implemented without the need to change the signaling and air interface protocols or the BMI (base station, Mobile Switching Center, and Interworking Function).

DETAILED DESCRIPTION OF THE PREFERRED EMBODIMENT(S)

The following description is written in terms of a cellular radiotelephone system; however, the invention is not necessarily limited to that environment. More specifically, the following description is written using terms which may be associated with ANSI-136 compliant systems, but it will be understood by those skilled in the art that the present invention may be implemented in other wireless communication environments including those which are designed in accordance with other standards, e.g., GSM, IS-95 or PDC, as well as those which use various access methodologies, e.g., CDMA.

Figure 1:
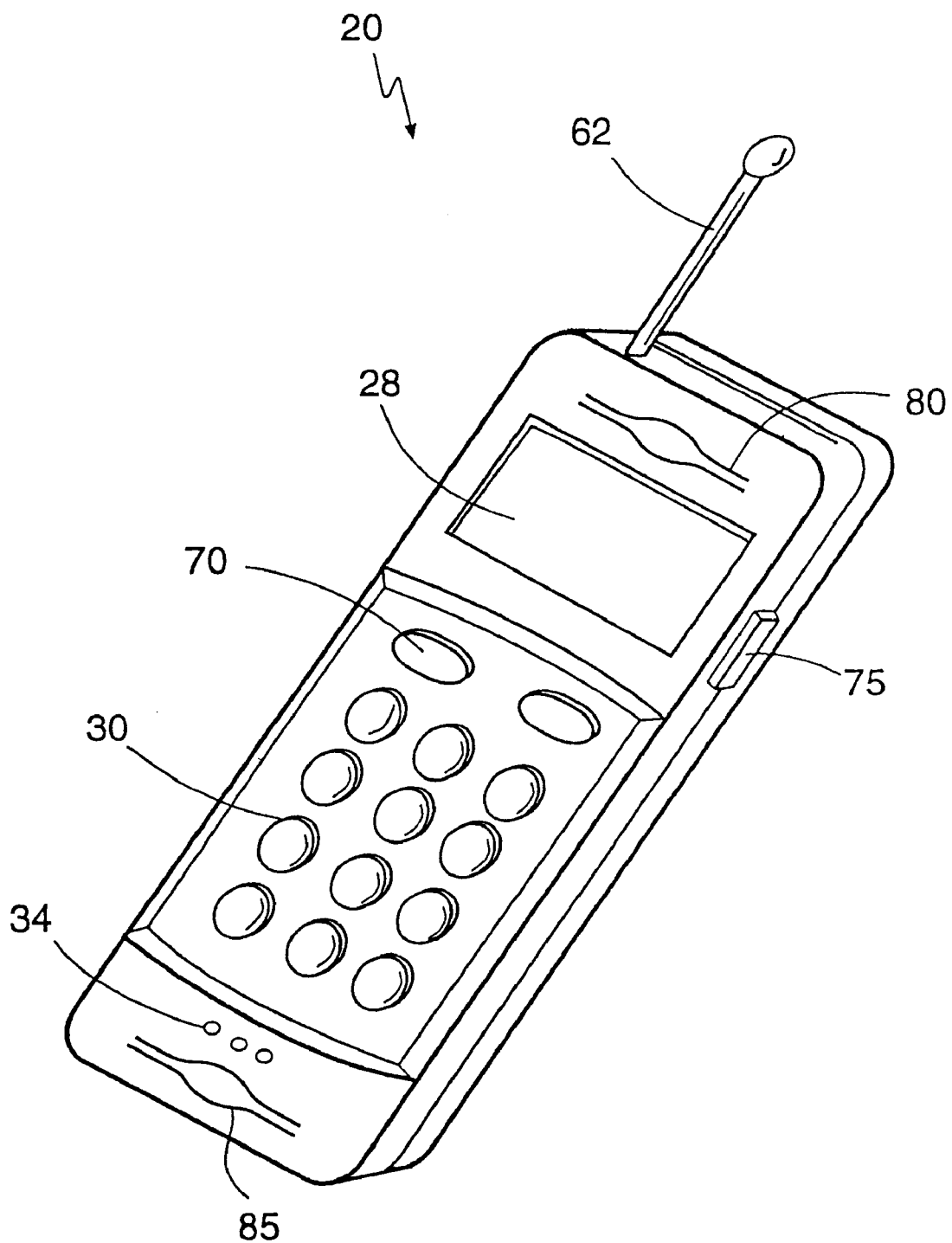
FIG. 1 is perspective view of one embodiment of a communications terminal, a wireless communications device, adapted for the present invention.

One embodiment of a mobile terminal suitable for use with the present invention is shown in FIG. 1 and indicated generally by the numeral 20. The mobile terminal shown is a digital cellular telephone, but the invention is not so limited but instead encompasses a wide variety of wireless communications devices, including cellular phones, personal communications assistants, pagers, and the like. Further, the present invention is not limited to wireless mobile terminals, but instead includes landline communications terminals, or other types of communications terminals, including Internet based communications terminals, that may receive incoming group calls. However, for simplicity of discussion a dual-mode wireless communications mobile terminal will be used as the primary illustrative example herein. More particularly, the phone 20 shown in FIG. 1 will be used as the primary illustrative example. The phone 20 is preferably a dual-mode phone capable of phone mode operation and radio mode operation as described below.

The cellular telephone 20 typically includes a controller 22, an operator interface 26, a transmitter 38, a receiver 50, and an antenna assembly 58. The operator interface 26 typically includes a display 28, keypad 30, control unit 32, microphone 34, and two speakers 80,85. The display 28 allows the operator to see dialed digits, call status, and other service information. The keypad 30 allows the operator to dial numbers, enter commands, and select options. The control unit 32 interfaces the display 28 and keypad 30 with the controller 22.

The microphone 34 receives acoustic signals from the user and converts the acoustic signals to an analog electrical signal. Speakers 80,85 convert analog electrical signals from the receiver 50 to acoustic signals which can be heard by the user. The first speaker 80 is low volume speaker, typically located above the display 28 so as to be proximate the user's ear when the phone 20 is held next to the users head in the traditional telephone handset orientation. The second speaker 85 is a high volume speaker typically located on the opposite end of the phone 20 from the low volume speaker 80. See FIG. 1. The low volume speaker 80 acts as the phone's primary speaker when the phone is in "phone mode," and the high volume speaker 85 acts as the phone's primary speaker in "radio mode," as discussed in more detail below. As necessary, there may be a switch (not shown) disposed in the circuit path leading to the speakers 80,85 for routing the audio output to one speaker or the other. Such a switch should operate under the control of the controller 22, either directly or indirectly.

The keypad 30 includes a plurality of keys, including at least a first key 70 and a second key 75. For purposes of this illustration, the first key 70 is a send key and the second key is a PTT key. It is to be understood that the keys of the keypad 30 may be physical keys or virtual keys (such as shown on the display 28), and the keys do not need to be disposed on only one area of the phone 20. Indeed, it is preferred that the send key 70 be located some distance from the PTT key 75. For instance, the send key 70 may be proximate a common three by four telephone key array disposed on a front face of the phone 20 while the PTT key 75 may be located on the side of the phone 20, proximate the display 28. See FIG. 1.

Figure 2:
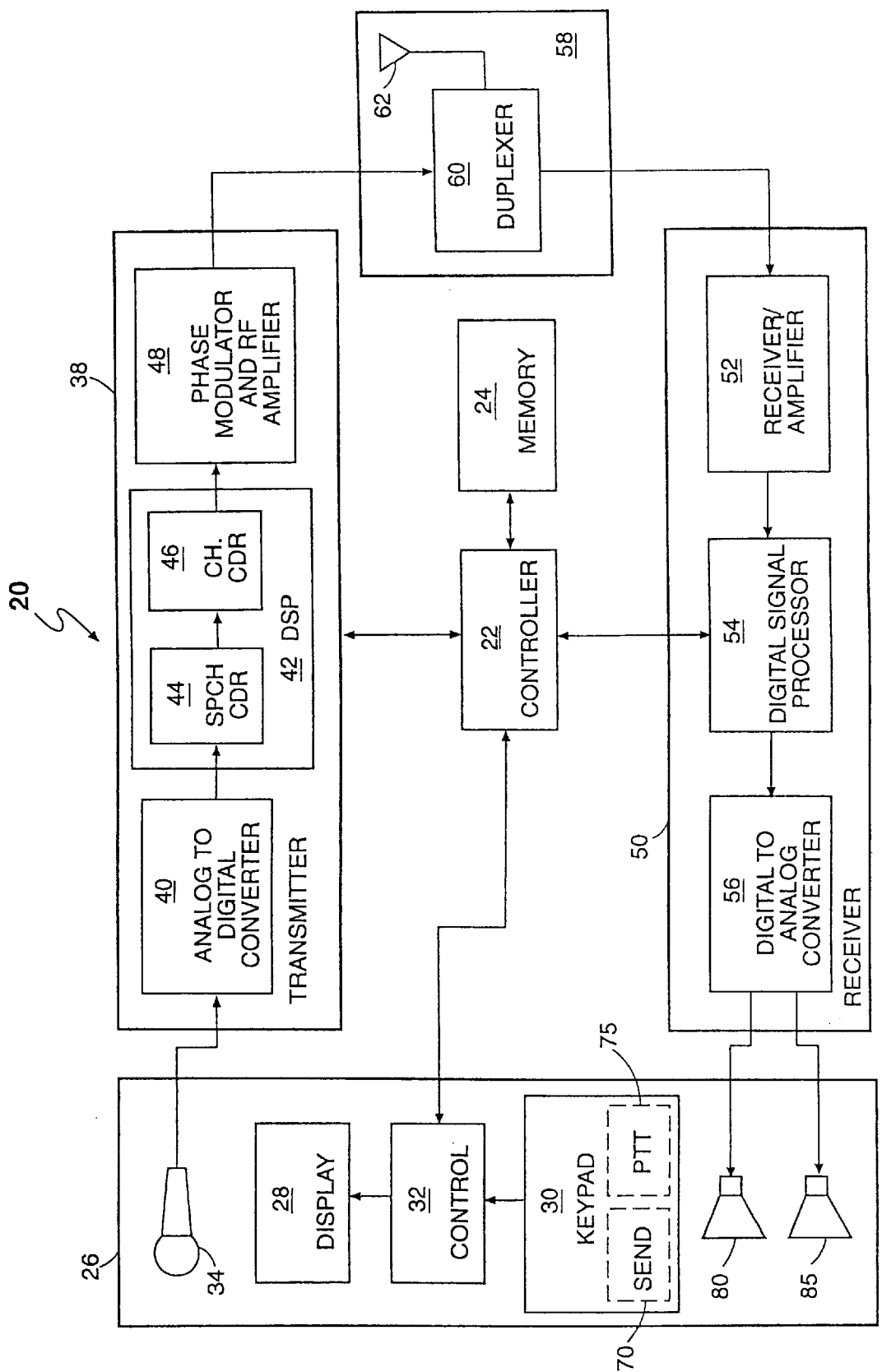
FIG. 2 is a schematic representation of the wireless communications device of FIG. 1.

The analog electrical signal from the microphone 34 is supplied to the transmitter 38. The transmitter 38 includes an analog to digital converter 40, a digital signal processor 42, and a phase modulator and RF amplifier 48. The analog to digital converter 40 changes the analog electrical signal from the microphone 34 into a digital signal. The digital signal is passed to the digital signal processor (DSP) 42, which contains a speech coder 44 and channel coder 46. The speech coder 44 compresses the digital signal and the channel coder 46 inserts error detection, error correction and signaling information. The DSP 42 may include, or may work in conjunction with, a DTMF tone generator (not shown). The compressed and encoded signal from the digital signal processor 42 is passed to the phase modulator and RF amplifier 48, which are shown as a combined unit in FIG. 2. The modulator converts the signal to a form which is suitable for transmission on an RF carrier. The RF amplifier then boosts the output of the modulator for transmission via the antenna assembly 58.

The receiver 50 includes a receiver/amplifier 52, digital signal processor 54, and a digital to analog converter 56. Signals received by the antenna assembly 58 are passed to the receiver/amplifier 52, which shifts the frequency spectrum, and boosts the low-level RF signal to a level appropriate for input to the digital signal processor 54.

The digital signal processor 54 typically includes an equalizer to compensate for phase and amplitude distortions in the channel corrupted signal, a demodulator for extracting bit sequences from the received signal, and a detector for determining transmitted bits based on the extracted sequences. A channel decoder detects and corrects channel errors in the received signal. The channel decoder also includes logic for separating control and signaling data from speech data. Control and signaling data is passed to the controller 22. Speech data is processed by a speech decoder and passed to the digital to analog converter 56. The digital signal processor 54, may include, or may work in conjunction with, a DTMF tone detector (not shown).

The digital to analog converter 56 converts the speech data into an analog signal which is applied to one of speakers 80, 85 to generate acoustic signals which can be heard by the user, as described in more detail below.

The antenna assembly 58 is connected to the RF amplifier of the transmitter 38 and to the receiver/amplifier 52 of the receiver 50. The antenna assembly 58 typically includes a duplexer 60 and an antenna 62. The duplexer 60 permits full duplex communications over the antenna 62, as necessary.

The controller 22 coordinates the operation of the transmitter 38 and the receiver 50, and may for instance take the form of a common microprocessor. This coordination includes power control, channel selection, timing, as well as a host of other functions. The controller 22 inserts signaling messages into the transmitted signals and extracts signaling messages from the received signals. The controller 22 responds to any base station commands contained in the signaling messages, and implements those commands. When the user enters commands via the keypad 30, the commands are transferred to the controller 22 for action.

Figure 3:
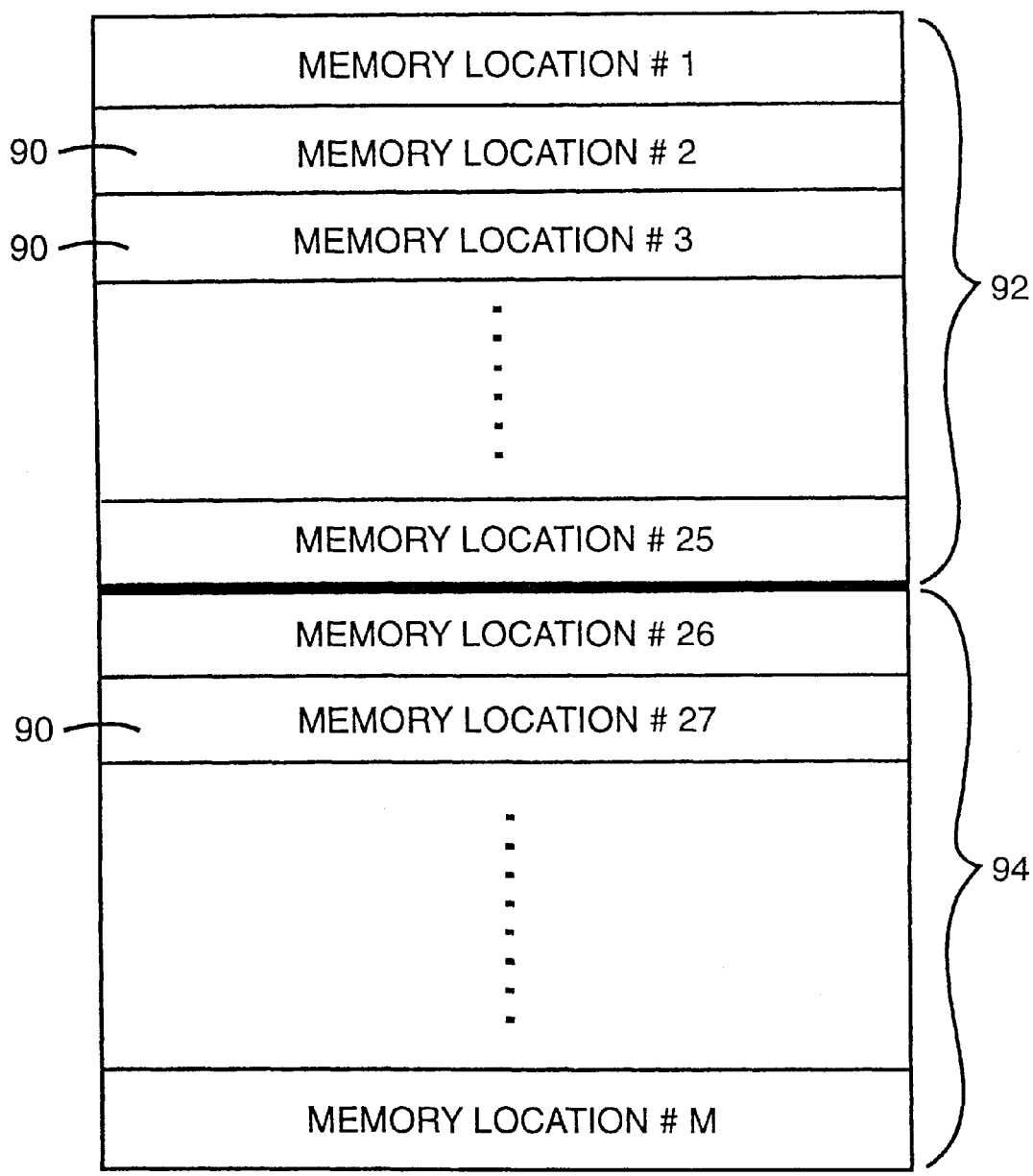
FIG. 3 shows a portion of memory including a plurality of memory locations for storing call addresses and related information.

Memory 24 stores and supplies information at the direction of the controller 22 and preferably includes both volatile and non-volatile portions. Included in memory 24 are a plurality of memory locations 90 for storing call addresses. See FIG. 3. These locations 90 may be thought of as divided into at least two sections, the first section 92 and the second section 94. The first section 92 includes the first N call address memory locations 90, while the second section 94 includes the balance. For purpose of illustration, N will be assumed to be twenty-five, but any number higher than one may be used. The user enters call addresses to be stored in the memory locations 90 via any method known in the art. It is anticipated that the memory locations 90 may be filled non-contiguously; for instance, memory locations 1, 4, 8, 10, 24, and 35–45 may be filled, while the remainder may be empty.

The phone 20 is preferably operational in both phone mode and radio mode. Phone mode is simply a phone operational mode that is characterized by full duplex operation of the phone 20 in any manner well known in the art, such as according to ANSI-136. In phone mode, a conversation appears to the user of the phone 20 to be simultaneously bidirectional. This behavior is common in digital cellular phones of the prior art. Radio mode is a phone 20 operational mode wherein the phone 20 appears to the user to be operating in a half duplex mode. In radio mode, a conversation appears to the user of the phone 20 to be bidirectional, but not simultaneously. Instead, during the call session, the operation of the microphone 34 and the speaker 85 are mutually exclusive. When the PTT key 75 is pushed, the microphone 34 of the phone 20 is active; when the PTT key 75 is not pushed, the speaker 85 is active. For ease of reference, the condition of the PTT key 75 corresponding to the active microphone 34 may be called the "speak position" and the condition of the PTT key 75 corresponding to the active speaker 85 may be called the "listen position." This type of operation is familiar to users of existing trunked-radio phones. Thus, when in radio mode, the phone 20 mimics the man-machine interface of a trunked-radio phone.

Preferably, radio mode behavior of the phone 20 is localized to the phone 20, meaning that the communications between the phone 20 and the remainder of the wireless communications system are as a digital cellular phone in phone mode, but the man-machine interface appears to the user to be like a trunked-radio phone. Thus, when the phone 20 is operating in radio mode, the phone 20 may appear to the remainder of the communications system as being either full duplex or half duplex. The only requirement on the phone operating in radio mode is that the phone 20 appear to the user as being half duplex, regardless of the reality as viewed from the perspective of the communications system. The radio mode operation of a phone 20 is further disclosed in co-owned U.S. patent application Ser. No. 09/234,191 which is incorporated herein by reference.

Typically, a user will fill one or more of the available memory locations 90 with call address information. Call address information is typically a common phone number, such as one associated with another cellular phone, or a traditional landline phone, or a computer, or the like. In addition, there may be an alphanumeric identification tag associated with each call address, such as a name or the like. The term "call address" is used herein rather than "phone number" because while call address information may be a phone number, the call address information may instead be a group identification number used to establish a group call.

A group call, as described above, is a special type of call where the call originator is trying to communicate with one or more members of a predefined user group. Group calls come in a variety of call types. Two common call types are Broadcast type and Talk type. For Broadcast type, the main information flow during the group call is one way, from one source (the originator) to one or more destinations (the group members). Thus, in a Broadcast type group call, only the originator of the group call may talk, while the recipients are limited to listening. For Talk type group calls, the main information flow during the group call may be bidirectional. Thus, in Talk type group calls, both the originator and the participating group members may both speak and listen.

Each call type may be further classified into call subtypes. For instance, Talk type groups calls may be further divided into Sequential, Simultaneous-First-Answer, and Conference subtypes. For Sequential subtype group calls, the wireless communications system overseeing the call attempts to contact the group members in sequence, giving each one a chance to respond before proceeding to the next. In the typical arrangement, a page is sent to the first group member; if the first group member fails to answer in a timely fashion, the page is cancelled and the second group member is paged, and so forth. Thus, the Sequential subtype group call may be thought of as a concatenated series of individual calls to the group members in a predetermined sequence, where the originator need not dial each number in series, but may instead dial a single group identification number. The Simultaneous-First-Answer subtype group calls are similar to the Sequential subtype group calls, but a page is sent out to all group members at the same time, and the call is connected to the first group member who answers the call. The Conference subtype group calls are similar to the Simultaneous-First-Answer subtype group calls, but all group members who answer the page are joined into the call. Thus, both Sequential and Simultaneous-First-Answer subtype group calls, when successful, result in a group call between the originator and one group member. In contrast, the Conference subtype group call, when successful, results in a group call between the originator and one or more group members.

Traditional dual-mode phones, those that automatically answer incoming calls in radio mode, create problems with group calls of the Sequential and Simultaneous-First-Answer subtype. With such calls, the search to find a group member terminates when a group member answers. If the user places the traditional dual-mode phone in radio mode and leaves the phone unattended for whatever reason, the phone still answers incoming group calls. If the phone receives a Sequential or Simultaneous-First-Answer call, the unattended phone will answer the call and the call originator will receive an indication that the group call has been answered. However, the call originator will not actually be communicating with a live user, but will be instead talking with the unattended phone. Thus, the call originator will either be speaking into thin air or will be asked to leave a message. In many situations, the call originator does not need to leave a message, but instead needs to talk with a live individual. With the prior art, the utility of the group call is defeated, and the originator will be frustrated by the unattended-but-answering phone, until the missing user returns to the phone, at some indeterminate time in the future.

The present invention addresses this and other problems by supplying certain phones with an indication of call type, and optionally other information, for group calls so as to distinguish such calls from other types of calls. To do so, the present invention contemplates the Group Call Server in charge of the group call selectively augmenting the calling party number field of the outgoing paging message with one or more indicator flags. By way of example, the Calling Party Number field of an ANSI-136 paging message on the SPACH channel (see ANSI-136-123 §5.3.9 and §6.23) may be increased in length. Because the length of the calling party field in the paging message can be readily changed within the existing air interface protocols, the present invention can be implemented without the need to change the air interface or the BMI (base station, Mobile Switching Center, and Interworking Function). Based on this additional information, the receiving phone may determine how to respond, such as by not automatically answering Sequential subtype group calls.

Typically, group calls are handled by a Group Call Server associated with the wireless communications system. The Group Call Server is a logical portion of the wireless communications system unit that oversees group calls, such as by tracking the membership of user groups, controlling access to user group functionality, coordinating information flow, etc. When the wireless communications system receives a group call request, the request is forwarded to the Group Call Server. The other portions of the wireless communications system then cooperate with the Group Call Server to facilitate the group call.

The Group Call Server typically includes a database of user groups, where each group member's call address (e.g., phone number) is listed. For the present invention, the Group Call Server database should preferably also include an indication of the equipment type for each call address. For instance, the equipment type may be a conventional, prior-art cellular phone, or the equipment type may be a traditional landline phone. Of particular interest to the present discussion, one of the equipment types should correspond to wireless communications devices (e.g., phones) adapted according to the present invention. For purposes of discussion only, and not by way of limitation, such wireless communications devices will be referred to as Enhanced Terminals. Thus, the records in the Group Call Server database should preferably include an indication when a particular call address corresponds to an Enhanced Terminal equipment type and when it does not.

Figure 4:
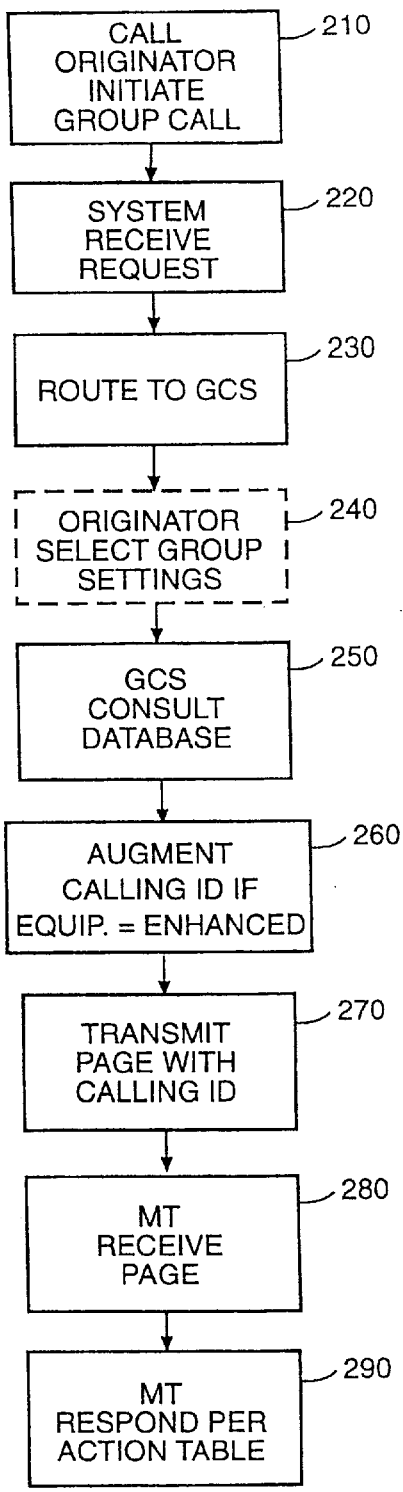
FIG. 4 shows one process flow for handling group calls according to the present invention.

Referring to FIG. 4, a group call originator typically initiates a group call (box 210) by dialing a pre-assigned user group identification number. In the United States, this group identification number typically consists of ten digits, much like an ordinary phone number. When the wireless communications system receives the group call request (box 220), the request is routed to the Group Call Server for handling (box 230). As shown in FIG. 4, the originator may optionally be given an opportunity to select the group call settings (box 240), such as call type, call subtype, and so forth, such as through a voice interaction system. In other embodiments, the call type and so forth is pre-set for each user group. It should be noted that the selection of group call settings (box 240) may occur after the Group Call Server becomes involved (box 230), or may occur earlier, the particular timing being a matter of preference.

After receiving notice of the request from the wireless communications system (box 230), the Group Call Server consults its database and determines which call addresses belong to the requested user group and initiates the group call set-up procedure (box 250). The Group Call Server interacts with the balance of the wireless communications system to page the group members, at the stored call addresses, in the appropriate manner depending on which call type and subtype selected. However, prior to triggering the page, the Group Call Server examines the equipment type indicated by the database record for the relevant group member. If the equipment type indicates that the mobile terminal being paged is a Enhanced Terminal, then the Group Call Server augments the calling party field of the paging message to include one or more flags for indicating the group call settings (box 260). For instance, if the group call is a Sequential subtype, then a flag value of "1" could be appended to the calling party field; if the group call is a Conference subtype, a "3;" if the group call is a Broadcast type, a "4;" and so forth. Preferably, only the paging messages targeted at Enhanced Terminals would be augmented, while paging messages targeted at other equipment types would not be altered. This is to avoid confusing existing systems and mobile terminals (those without the present invention), while allowing the improved systems and mobile terminals of the present invention to offer the enhanced feature while remaining backwardly compatible.

The paging messages are then transmitted to the appropriate mobile terminal(s) (box 270) by the appropriate portions of the wireless communications system. Assuming that the targeted mobile terminal is an Enhanced Terminal, the targeted mobile terminal receives the paging message and checks for augmentation (box 280). If the augmentation is not present, then the Enhanced Terminal auto-answers the call. If the augmentation is present, the Enhanced Terminal consults a response look-up table in memory to determine how to respond. For purposes of illustration, the look-up table instructs the Enhanced Terminal to auto-answer Broadcast and Conference group calls, but to not auto-answer Sequential and Simultaneous-First-Answer group calls. Based on the response look-up table, the Enhanced Terminal responds to the page by, for instance, either auto-answering or by generating an alert such as an audible ring (box 290). Thus, for those mobile terminals enhanced according to the present invention, the auto-answer feature may be selectively disabled for group calls in radio mode, depending on the characteristics of the group call.

In addition to call types, the group call may have a priority level assigned thereto. For instance, a priority level of "normal" may be the default for most group calls, but the originator may be allowed to change the priority level to "alert" for more urgent group calls. In such a situation, two indicator flags may be used, and the response of the Enhanced Terminal mobile terminals may be, according to the following table:

TABLE 1

| Indicator Flags ↓ → | 1 | 2 | 3 | 4 |
|---|---|---|---|---|
| * (normal) | Sequential | Simultaneous-First-Answer | Conference | Broadcast |
| # (alert) | Alert-Sequential | Alert-Simultaneous-First-Answer | Alert-Conference | Alert-Broadcast |
| Auto Answer? | No | No | Yes | Yes |

As can be seen in Table 1, the characters used for the indicator flags should include an unusual character, such as "*" or "#," or at least start with an unusual character, so that detecting the presence of the indicator flags may be simplified. asdf It should be noted that the originator may initiate a group call typically in one of two ways. First, the originator may call a publicly defined user group identification number. This user group identification number is publicly defined in that any user calling that number will reach the same user group, assuming that they are authorized to access the group. A group call initiated in such a way will be referred to as a "pilot" group call. In the United States, the pilot group identification numbers are typically ten digits in length. A wireless communications system receiving a group identification number in the dialed digits field routes the call to the Group Call Server for handling. The Group Call Server then determines the group membership associated with that group identification number and goes about setting up the group call. Alternatively, the group call originator may also initiate a group call by dialing a privately defined group identification number, such as "*12." A group call initiated in such a way will be referred to as a "private" group call. Unlike pilot group numbers, the private group numbers may have different meanings for different users. When the wireless communications system receives "*12" in the dialed digits field, the wireless communications system recognizes this as a group call request and routes the request to the Group Call Server. The Group Call Server would in turn determine which user group to call based on the dialed digits (*12) and the particular subscriber originating the call. Thus if subscriber A were to dial "*12," the Group Call Server would generate a group call to a different user group than if subscriber B were to dial "*12."

Preferably, the Group Call Server handles pilot group calls differently than private group calls. For private group calls, the calling party number included in the paging message should be the originator's call address. However, for pilot group calls, the calling party number included in the paging message should preferably be pilot group number instead. Thus, for private group calls, the receiving terminals programmed to display caller ID will display the originator's number, while for pilot group calls, the receiving terminals will display the user group's pilot number. It should be noted that various settings governing the operation of the group call server in some systems may prevent the substitution of the pilot number for the originator's number, for instance to comply with local law.

By way of example using the both the pilot/private and priority level options described above, assume that originator unit 888 444-1111 initiates a pilot group call of Sequential type with alert priority by dialing group identification number 999 555-2525. Further assume that the user group includes three group members with the first and second members having Enhanced Terminals, and the third group member having a conventional mobile terminal. The Group Call Server that routed this request will initiate a paging message to the first group member. Because the first group member has a Enhanced Terminal, as indicated in the Group Call Server's database, the paging message will have a calling party field that includes 9995552525#1 as the calling party ID. The mobile terminal of the first group member should not auto-answer the call due to the presence of the "#1" suffix in the calling party field. If the first group member does not manually answer within a pre-determined time, the page will switch to the second group member. This page will likewise include the 9995552525#1 in the calling party field, causing the second group member's mobile terminal (also Enhanced Terminal equipment type) to likewise not auto-answer. When the second group member fails to answer in a timely fashion, the page will switch to the third group member. However, since this group member does not have an Enhanced Terminal, the "#1" suffix will not be appended to the calling party ID in the paging message. Upon receiving the paging message, the third group member's mobile terminal will auto-answer the call, if programmed to do so for incoming calls, but not depending on the presence, absence, or content of any indicator flags of the present invention.

If the scenario is changed so that the same originator initiates a private group call of Conference type with normal priority by dialing *12, the Group Call Server will initiate at least two paging messages. For the first and second group members, the paging message will have a calling party field that includes 8884441111*3 as the calling party ID. For the third group member's paging message, the calling party field will include 8884441111 as the calling party ID, without the "*3" suffix. In this arrangement, all the receiving mobile terminals will auto-answer the call, resulting in a Conference type group call.

While the response of the Enhanced Terminal type mobile terminals 20 has been described in terms of whether to auto-answer the group call or not, other responses are also possible. For instance, based on the information provided by the indicator flags, the mobile terminals 20 of the present invention may vary information displayed on their displays 28 or change their alert signals (e.g., ring tone, ring volume, vibrations generated, etc.) depending on the characteristics of the incoming group call. Just by way of example, the mobile terminal may loudly ring with a particular tone when a group call with alert priority is detected, and "Alert" may be indicated on the display 28, while group calls of Sequential subtype with normal priority may only result in a low level vibration and a display of the caller ID. Of course, these responses of the mobile terminal 20 may be pre-set at the factory or may be user selectable to provide maximum flexibility.

The discussion above has been in terms of the group call server causing the paging message to be altered under certain circumstances related to the equipment type of the targeted mobile terminal(s). It should be noted that the paging message itself may reside entirely on a portion of the SPACH or equivalent control channel; alternatively, the paging message may reside on more than one channel, including a portion of the SPACH or equivalent control channel. For instance, the paging message may comprise a pointer message on the SPACH control channel and more detailed information packet(s) on the pointed-to channel. Thus, as used herein, the term paging message includes any transmitted information that a mobile terminal automatically searches for in order to determine whether the mobile terminal has an incoming call and the nature of that call.

Further, the discussion above has been in terms of the group call server altering the paging message to include indicators of one or more group call characteristics. In the primary illustrative embodiment, the group call server appends indicator flag characters to the calling party field of the paging message. However, it is not necessary for characters to added per se. Instead, the present invention also encompasses equivalent methods of augmenting existing messages to include additional information, such as by further encoding the message by superimposing a second message, using different encoding schemes, etc. Thus, it is only necessary that the paging message be altered from the form that it would otherwise take, and that the alteration provides an indication of one or more of the characteristics of the group call.

As indicated above, the present invention is not limited to cooperative functioning with just wireless mobile terminals, but instead applies as well to other types of communications terminals. For instance, a traditional landline phone with caller ID functionality may be altered to take advantage of the present invention. Such an enhanced phone should likewise examine the incoming calling party field for the presence or absence of the augmentation, and base its response to the call on the augmented information if present. Similarly, a computer with a telephony communications card may be programmed to take advantage of the present invention. Thus, the present invention is intended to be used with a variety of communications terminals, including internet based communications terminals, that may receive notice of incoming group calls via a paging message that includes a calling party field.

The present invention may, of course, be carried out in other specific ways than those herein set forth without departing from the spirit and essential characteristics of the invention. The present embodiments are therefore to be considered in all respects as illustrative and not restrictive, and all changes coming within the meaning and equivalency range of the appended claims are intended to be embraced therein.

What is claimed is:

1. A method of operating a group call server in a communications system, comprising:
   a) establishing a database of user groups having one or more group members, said database noting when the corresponding group member is associated with a communications terminal of a first communications terminal type;
   b) thereafter, receiving a request from an originator to establish a group call with a user group;
   c) in response to said group call request, said group call server composing a paging message targeted at one or more of said group members, said paging message selectively indicating one or more characteristics of said group call depending on whether said database indicates the corresponding targeted group member is associated with a communications terminal of said first communications terminal type; and
   d) said group call server triggering the transmission of said paging message to at least one communications terminal associated with the corresponding user group associated with said group call.

2. The method of claim 1 wherein said paging message includes a calling party field and wherein said composing includes said group call server augmenting said calling party field to indicate one or more characteristics of said group call when said database indicates the corresponding targeted group member is associated with a mobile terminal of said first mobile terminal type.

3. The method of claim 2 wherein said group call server augmenting includes adding at least one coded flag to said calling party field.

4. The method of claim 3 wherein said coded flag includes a first part corresponding to the priority level of said group call and a second part corresponding to the call type and call subtype of said group call.

5. The method of claim 1 wherein said group call characteristics indicated by said paging message include the group call subtype of said group call.

6. The method of claim 1 wherein said communications terminal is selected from a group consisting of a landline phone, a cellular phone, and a satellite phone.

7. A method of operating a group call server in a wireless communications system, comprising:
   a) establishing a database of user groups having one or more group members, said database noting when the corresponding group member is associated with a wireless mobile terminal of a first mobile terminal type;
   b) thereafter, receiving a request from an originator to establish a group call with a user group;
   c) in response to said group call request, said group call server composing a paging message targeted at one or more of said group members, said paging message selectively indicating one or more characteristics of said group call depending on whether said database indicates the corresponding targeted group member is associated with a mobile terminal of said first mobile terminal type; and
   d) said group call server triggering the transmission of said paging message to at least one mobile terminal associated with the corresponding user group.

8. The method of claim 7 wherein said paging message includes a calling party field and wherein said composing includes said group call server augmenting said calling party field to indicate one or more characteristics of said group call when said database indicates the corresponding targeted group member is associated with a mobile terminal of said first mobile terminal type.

9. The method of claim 8 wherein said group call server augmenting includes adding at least one coded flag to said calling party field.

10. The method of claim 9 wherein said coded flag includes a first part corresponding to the priority level of said group call and a second part corresponding to the call type and call subtype of said group call.

11. The method of claim 7 wherein said group call characteristics indicated by said paging message include the call type of said group call.

12. The method of claim 11 wherein the call type of said group call may be set to at least a first type corresponding to a broadcast type wherein only the originator of the group call may generate source message signals and a second type corresponding to a talk type wherein source message generation is not limited to the originator of the group call.

13. The method of claim 12 wherein said first call type has a plurality of possible call subtypes including at least a sequential subtype, a simultaneous-first-answer subtype, and a conference subtype.

14. The method of claim 7 wherein said group call characteristics indicated by said paging message include the call subtype of said group call.

15. The method of claim 7 wherein said group call characteristics indicated by said paging message include the priority level of said group call.

16. The method of claim 15 wherein the priority level of said group call may be set to at least a first level corresponding to a normal priority or to a second level corresponding to an alert priority.

17. The method of claim 7 wherein said group call characteristics indicated by said paging message include the call subtype and priority level of said group call.

18. The method of claim 7 further including said group call server allowing the originator of said group call to set the priority level of the group call prior to said triggering of the transmission of said paging message and wherein said group call characteristics indicated by said paging message include said set priority level of said group call.

19. The method of claim 7 wherein said paging message is compliant with ANSI-136.

20. The method of claim 8 further including said group call server substituting a pilot group number for a calling party number in said calling party number field when said group call is in response to the originator using a pilot group number.

21. A group call server in a wireless communications system, comprising:

a) a database of user groups having one or more group members, said database including an indication when the corresponding group member is associated with a wireless mobile terminal of a first mobile terminal type;

b) said group call server adapted to compose a paging message targeted at one or more of said group members in response to receiving a group call request, said paging message selectively indicating one or more characteristics of said group call depending on whether said database indicates the corresponding targeted group member is associated with a mobile terminal of said first mobile terminal type; and c) said group call server adapted to trigger the transmission of said paging message to at least one mobile terminal associated with the corresponding user group associated with said group call in response to receiving a group call request.

22. The group call server of claim 21 wherein said group call server is further adapted to allow the originator of a group call to set the priority level of the group call during group call set-up.

23. The group call server of claim 21 wherein said paging message includes a calling party field and wherein said group call server is further adapted to cause said calling party field to include a pilot group number when said group call is in response to the originator using a pilot group number to initiate said group call.

24. A group call server in a wireless communications system programmed to at least:

a) store an indication of the equipment type of selected equipment associated with at least one user group;

b) allow the originator of a group call to set the priority level of the group call during group call set-up;

c) respond to the initiation of a group call by initiating the transmission of a paging message to at least one mobile terminal associated with the corresponding user group associated with said group call, said paging message including a calling party field, said calling party field selectively augmented by said group call server to include at least one coded flag indicating the priority level of the group call and the call type of said group call depending on whether the corresponding equipment type for said mobile terminal is a first mobile terminal type.

25. The group call server of claim 24 wherein said group call server is further programmed to substitute a pilot group number for a calling party number in said calling party number field when said group call is initiated by the originator using a pilot group number.

\* \* \* \* \*